United States Patent [19]

Dollar

[11] 4,317,663

[45] Mar. 2, 1982

[54] AIR FILTER INCLUDING A VORTEX DEVICE

[76] Inventor: Delmar L. Dollar, 1422 E. Rosecrans, Compton, Calif. 90221

[21] Appl. No.: 170,139

[22] Filed: Jul. 18, 1980

[51] Int. Cl.³ .................. B01D 46/42; F02M 7/00
[52] U.S. Cl. ............................ 55/413; 55/455; 55/DIG. 28; 123/593
[58] Field of Search .......... 55/327, 330, 337, 413, 55/414, 446, 447, 455, 510, DIG. 28; 123/590, 593

[56] References Cited

U.S. PATENT DOCUMENTS

| 1,513,036 | 10/1924 | Donaldson | 55/330 |
| 1,729,390 | 9/1929 | Kamrath | 55/DIG. 28 |
| 1,840,831 | 1/1932 | Champion | 55/447 |
| 2,537,346 | 1/1951 | Henszey | 55/447 |
| 3,853,518 | 12/1974 | Tu et al. | 55/455 |
| 3,877,907 | 4/1975 | Elliff | 55/413 |

FOREIGN PATENT DOCUMENTS 105959  3/1965  Norway ............... 55/455

Primary Examiner—David L. Lacey
Attorney, Agent, or Firm—Jack C. Munro

[57] ABSTRACT

In combination with a ring-shaped air filter for the entry of air into the carburetor of an internal combustion engine, a vortex generator in the form of a series of vanes mounted within the interior of the ring-shaped air filter. The vanes are specially configured to produce a turbulent pressurized vortex which is moved through the carburetor which results in producing (1) a more homogeneous fuel/air mixture, and (2) increases the pressure of the fuel/air mixture. As a result, more efficient burning of the fuel occurs producing increased efficiency of the internal combustion engine.

4 Claims, 6 Drawing Figures

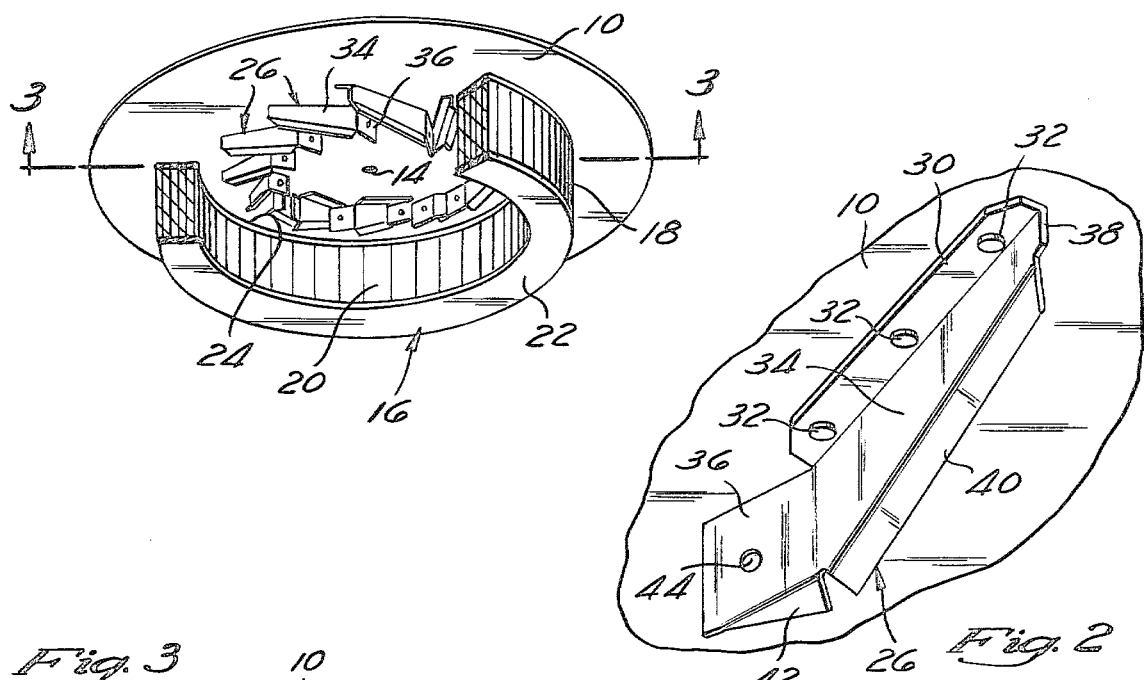
Fig. 1
Fig. 2
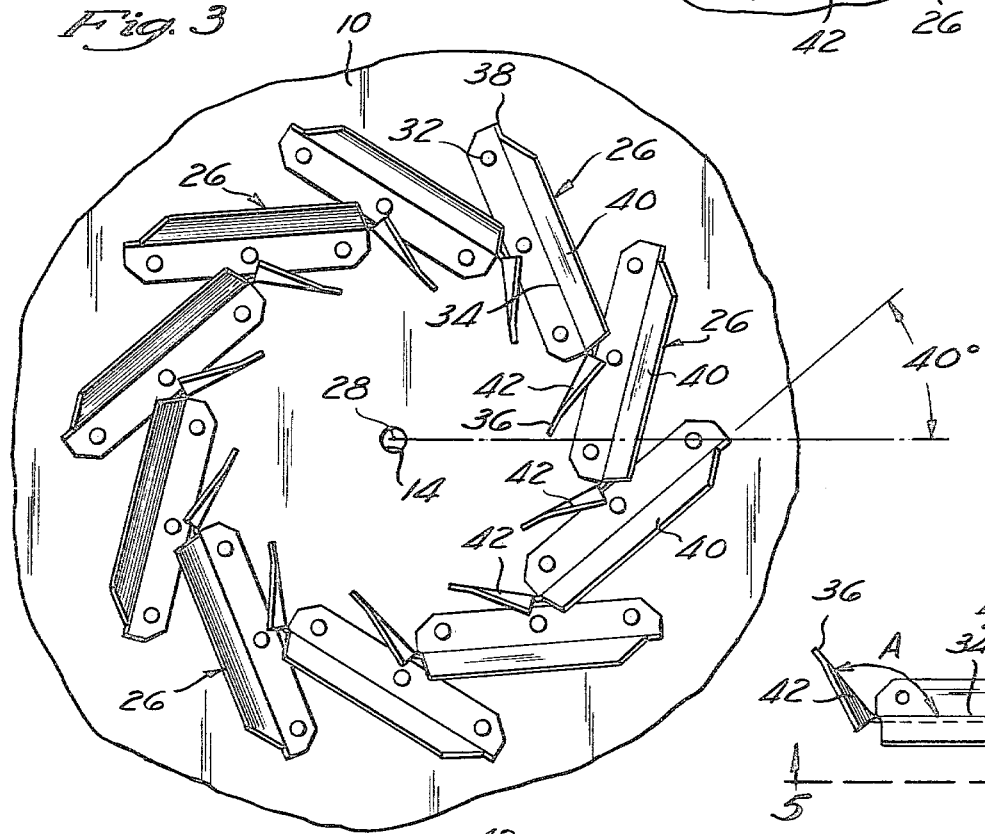
Fig. 3
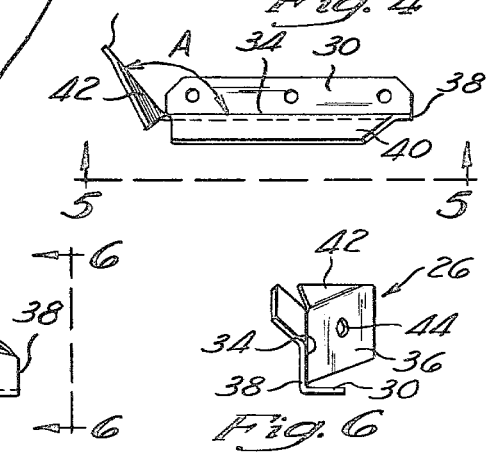
Fig. 4
Fig. 5
Fig. 6

AIR FILTER INCLUDING A VORTEX DEVICE

BACKGROUND OF THE INVENTION

The field of this invention relates to fuel saving devices and more particularly to a fuel saving device which is to be employed in conjunction with an internal combustion engine, and even more particularly to be located in conjunction with the inlet air filter apparatus of the internal combustion engine.

Within internal combustion engines found on most automobiles, the engine takes in large volumes of air at a relatively rapid rate which is then conducted through venturis within a carburetor wherein the air is to be mixed with vaporized gasoline and then conducted within the firing cylinders of the engine. At present, carburetors accomplish approximately forty percent vaporization of the gasoline in the air and this low vaporization rate results in incomplete and inefficient combustion of the gasoline in the engine cylinders, resulting in relatively poor gasoline mileage for the vehicle being driven and a relatively high output of products of combustion, generally referred to as pollutants.

The use of a fuel saving device to be employed in conjunction with an internal combustion engine has long been known. Such devices can take numerous forms. It has been known that if some type of structure was included within the fuel/air stream prior to entry within the firing cylinders and that this structure causes turbulence of the fuel/air stream, that the turbulence would provide for more efficient burning of the fuel since the mixture would tend to become more homogeneous. Such devices are generally known as vortex creating devices.

Within the past, such vortex creating devices have been mounted between the carburetor and the fuel intake manifold of the internal combustion engine. Some of these devices are definitely of value and do contribute to more efficient burning of the fuel. However, if some type of device could be employed to cause the air to be supplied to the carburetor in a turbulent manner and also to be supplied at increased pressure, such a device would also further enhance more complete mixture of the fuel and air to therefore cause the engine to operate more efficiently and with less pollutants.

SUMMARY OF THE INVENTION

The structure of this invention is designed to be employed upstream of the carburetor in conjunction with inlet air filter assembly. The inlet air filter assembly includes a ring-shaped filter through which inlet air is to be conducted into a centrally located enclosed area. A plurality of spaced-apart vanes are symetrically arranged about the central point of the enclosed area and located within the enclosed area. The vanes are arranged so that there is to be an airstream conducted between each adjacent pair of vanes. The shape of each of the vanes is such that the direction of each airstream is caused to be emitted into the enclosed area tangentially with respect to the central point of the enclosed area. As a result, instead of the air being drawn into the enclosed area, the air is caused to move in a swirling pattern about the central point resulting in the production of a vortex which is moved into the carburetor to facilitate homogeneous mixing of the air with the vaporized fuel.

The primary objective of this invention is to construct a device which can be readily attached to existing internal combustion vehicle equipment and which will produce a substantial increase in fuel economy of the vehicle and a substantial decrease in emitted pollutants.

BRIEF DESCRIPTION OF THE DRAWING

FIG. 1 is a perspective view showing the vortex creating device of this invention placed in conjunction with a conventional, ring-shaped, air filter;

FIG. 2 is an enlarged perspective view of a single vane employed within the vortex creating device of this invention;

FIG. 3 is a plan view taken along line 3—3 of FIG. 1;

FIG. 4 is a bottom plan view of a single vane of the vortex creating device of this invention;

FIG. 5 is a back elevational view of a single vane employed within the vortex creating device of this invention taken along line 5—5 of FIG. 4; and FIG. 6 is a front elevational view taken along line 6—6 of FIG. 5.

DETAILED DESCRIPTION OF THE SHOWN EMBODIMENT

Referring particularly to the drawing, there is shown in FIG. 1 a flat, thin, circular plate 10 which functions as a cover for the air filter assembly (not shown) which is mounted in conjunction with an internal combustion engine (not shown). The plate 10 has a center hole 14 through which is to be conducted a screw fastener in order to secure the plate 10 onto the air filter assembly.

A ring-shaped air filter 16 is shown that is deemed to be conventional. The air filter 16 includes an exterior surface 18 and an interior surface 20. The interior surface 20 forms an enclosed chamber. The air filter 16 also includes a bottom edge 22 and a top edge 24. It is to be understood that air is to be drawn from the ambient through the exterior surface 18, through the filter mechanism of the air filter 16, and be discharged through the interior surface 20 into the enclosed area. The air is then to be moved down into the carburetor to be mixed with vaporized fuel to be then injected into the firing cylinders of the internal combustion engine.

Fixedly attached onto the cover 10 are a plurality of vanes 26. It is to be noted that there are ten in number of the vanes 26, but this is deemed to be a matter of choice. There could be a lesser number of vanes or a greater number, whatever is deemed to be desirable. Each of the vanes 26 is deemed to be identical and are equidistantally spaced apart, as well as being symetrically arranged with respect to the central point 28 of the cover 10. Central point 28 also is on the center axis passing through the center of the air filter 16.

Each of the vanes 26 include an attaching flange 30. Each attaching flange 30 of each vane 26 is to be secured by rivets 32 to the cover 10. Each vane 26 includes an elongated section 34 and a shortened section 36. The shortened section 36 is integrally connected to the elongated section 34. It is also to be noted that the elongated section 34 is integrally secured to the attaching flange 30. The shortened section 36 is integrally secured to the elongated section 34 at the forward edge of the elongated section 34. The elongated section 34 has a back edge 38.

The outer edge of the elongated section 34 has integrally attached thereof a flange 40. The flange 40 is directed in an inclined manner toward the rear surface of the vane 26. The approximate angle of inclination of the flange 40 to the rear surface is forty five degrees.

It is to be noted that the height of the elongated member 34 adjacent the back edge 38 is significantly less than the height at the connection of the elongated section 34 with the shortened section 36. This slope can be varied to be between eight and fifteen degrees resulting in the short height being approximately a half an inch with the greatest height being approximately one inch. This height is selected in view of the height of the air filter 16 which is normally about one and a half to two inches.

Each vane 26 is positioned on the cover 10 so that the back edge 38 is located the exact same distance from the center point 28. Normally, this distance is so that the back edge 38 will be positioned directly adjacent the inside surface 20 of the air filter 16. Also, the plane of the front surface of the elongated section 34 is located at a precise angle (approximately forty degrees) with respect to the line connecting the central point 28 and the back edge 38. Although forty degrees is the most desirable angle, it is to be understood that this angle could be varied and for one particular type of automobile, an angle other than forty degrees may be desired to be utilized.

The shortened section 36 is inclined with respect to the front surface of the elongated section 34. A preferable angle of inclination, angle A, would be approximately forty five degrees. Also, the physical length of the shortened section 36 will normally be approximately three quarters of an inch to one and a quarter inches.

It is to be noted that the bottom edge of the shortened section 36 is cut at a slight angle of approximately eight to twelve degrees. This angle is shown in FIG. 5 as angle B. The reason for this will be explained further on in the specification.

The upper edge of the shortened section 36 is attached to flange 42. The flange 42 is bent at approximately forty five degrees, similar to flange 40 and also is directed in the same direction.

It is to be noted that there is shown a hole 44 within the shortened section 36. The purpose of the hole 44 is to effect a slight intermixing between adjacent airstreams for increased turbulence. However, it is deemed that the use of the hole 44 is optional.

It is also considered to be within the scope of this invention to have the flange 42 point in the opposite direction toward the frontal surface of the vanes 26. Also, it would be considered to be within the scope of this invention to even include a separate similar flange on the lower edge of the shortened section 36. This produces a channel affect of the airstream which could be desirable in certain installations. Actually, it may be considered to be within the scope of this invention that in certain instances, that the shortened section 36 could even be eliminated.

In the operation of this invention, the air that is being conducted to within the enclosed chamber must pass between the vanes 26. This results in actually ten separate airstreams being formed. Each airstream is passed over its respective shortened section 36 and discharged into the enclosed areas substantially tangentially with respect to the central point 28. This results in a swirling vortex action being created which is substantially tubular which is being forced downward into the carburetor. In actual practice, it has been found that due to this type of action, there is an increased pressure of air being supplied into the carburetor which produces a turbocharging effect. This increased pressure is desirable, as the air is slightly pressurized when it enters the firing chambers which causes more complete burning of the fuel.

Also, the swirling of the vortex produces a turbulent action and the air spilling over the flanges 40 and 42 and under the bottom edge of the shortened sections 36 produces a still further turbulent action with adjacent airstreams. The gap under the shortened sections 36 is due to the aforementioned forming of angle B. This turbulent action facilitates a homogeneous mixing between the air and the fuel to further enhance complete burning.

It is to be understood that although this invention has been described in conjunction with an automobile, this invention can be utilized with any internal combustion engine, examples being motorcycles, farm equipment, marine engines, garden equipment and power plant engines.

What is claimed is:

1. In combination with an air filter adapted to be positioned to remove foreign particles from air prior to intermixing of the air with vaporized fuel for entry into the firing chambers of an internal combustion engine, said air filter having an exterior surface and an interior surface and a top edge and a bottom edge, said interior surface forming an enclosed area, said enclosed area having a central point, air is to be conducted into said enclosed area to be then exited therefrom through said bottom, a cover mounted against said top edge of said air filter closing said top of said enclosed area, a device for generating a vortex of air that is being exited from said enclosed area, said device comprising:

a plurality of spaced-apart vanes mounted within said enclosed area, said vanes being attached to said cover, the air being conducted into said enclosed area is caused to move past said vanes to be formed into a plurality of separate airstreams, said separate airstreams are then directed tangentially in respect to said central point thereby producing a vortex;

each said vane being constructed of sheet material having an elongated section and a shortened section and each of said sections having a frontal surface and a rear surface, the said frontal surface of one said vane cooperating with the said rear surface of a directly adjacent said vane to produce a path for air forming a said airstream, said frontal surface of said elongated section being planar, said frontal surface of said shortened section being planar, said frontal surface of said shortened section being inclined forming a first angle with respect to said frontal surface of said elongated section, said shortened section being located downstream of said elongated section with respect to the path of air flow, said shortened section having an outer free edge located within said enclosed area; and the height of said elongated section at the connection to said shortened section being substantially greater than the height on the opposite end of said elongated section, said frontal surface of said elongated section being inclined at a second angle in respect to a line connecting said central point and said opposite end of said elongated section, said first angle being approximately one hundred and thirty degrees with said second angle being approximately forty degrees.

2. The combination as defined in claim 1 wherein:
   said elongated section having an unattached elongated first outer edge, said first outer edge being formed into a first flange, said first flange being inclined with respect to said frontal surface of said elongated section forming an obtuse angle with respect thereto.

3. The combination as defined in claim 2 wherein: said shortened section having a second outer edge, said second outer edge being located substantially directly adjacent said first outer edge, said second outer edge being formed into a second flange, said second flange being inclined with respect to said frontal surface of said shortened section.

4. The combination as defined in claim 1 wherein: said shortened section having an inner edge, said inner edge being located directly adjacent said cover but spaced therefrom forming a gap therebetween, said gap functioning to initiate intermixing of the airstreams conducted on opposite sides of each said vane.

\* \* \* \* \*